US006853986B1

(12) United States Patent
Rosenau et al.

(10) Patent No.: US 6,853,986 B1
(45) Date of Patent: Feb. 8, 2005

(54) ARRANGEMENT AND METHOD FOR GENERATING A SECURITY IMPRINT

(75) Inventors: Dirk Rosenau, Berlin (DE); Andreas Wagner, Berlin (DE)

(73) Assignee: Francotyp-Postalia AG & Co., Birkenwerder (DE)

( * ) Notice: Subject to any disclaimer, the term of this patent is extended or adjusted under 35 U.S.C. 154(b) by 598 days.

(21) Appl. No.: 09/593,406

(22) Filed: Jun. 14, 2000

(30) Foreign Application Priority Data

Jun. 15, 1999 (DE) ........................................ 199 28 058

(51) Int. Cl.[7] ................................................ G06F 17/60

(52) U.S. Cl. ............................ 705/60; 705/61; 705/62; 705/401; 380/23

(58) Field of Search ............................ 705/60–62, 401, 705/405, 408; 380/23

(56) References Cited

U.S. PATENT DOCUMENTS

| | | | | | |
|---|---|---|---|---|---|
| 4,217,484 | A | * | 8/1980 | Gerst | 235/30 A |
| 4,422,148 | A | * | 12/1983 | Soderberg et al. | 705/410 |
| 4,516,209 | A | * | 5/1985 | Scribner | 705/406 |
| 4,649,266 | A | * | 3/1987 | Eckert | 235/432 |
| 4,725,718 | A | * | 2/1988 | Sansone et al. | 235/375 |
| 4,775,246 | A | * | 10/1988 | Edelmann et al. | 380/51 |
| 4,809,185 | A | * | 2/1989 | Talmadge | 705/403 |
| 4,831,555 | A | | 5/1989 | Sansone et al. | |
| 4,858,138 | A | * | 8/1989 | Talmadge | 705/408 |
| 4,934,846 | A | * | 6/1990 | Gilham | 101/72 |
| 5,548,163 | A | * | 8/1996 | French | 180/287 |
| 5,572,429 | A | * | 11/1996 | Hunter et al. | 705/404 |
| 5,671,146 | A | * | 9/1997 | Windel et al. | 235/375 |
| 5,680,463 | A | * | 10/1997 | Windel et al. | 380/51 |
| 5,696,829 | A | * | 12/1997 | Cordery et al. | 380/29 |
| 5,970,150 | A | * | 10/1999 | Sansone | 380/51 |
| 5,991,409 | A | * | 11/1999 | Windel et al. | 380/51 |
| 6,019,281 | A | * | 2/2000 | Emmett et al. | 235/375 |
| 6,041,704 | A | * | 3/2000 | Pauschinger | 101/91 |
| 6,058,193 | A | * | 5/2000 | Cordery et al. | 380/277 |
| 6,125,357 | A | * | 9/2000 | Pintsov | 380/51 |
| 6,208,980 | B1 | * | 3/2001 | Kara | 101/71 |
| 6,418,422 | B1 | * | 7/2002 | Guenther et al. | 235/375 |

FOREIGN PATENT DOCUMENTS

| | | | | |
|---|---|---|---|---|
| DE | 19757652 A1 | * | 6/1999 | G06K/9/00 |
| EP | 0 647 925 | | 12/1995 | |
| EP | 0 782 112 | | 7/1997 | |
| EP | 0 862 143 | | 2/1999 | |

OTHER PUBLICATIONS

"Information Based Indicia Program Postal Security Device Specification," United States Postal Service, Jun. 13, 1996.

* cited by examiner

*Primary Examiner*—John W. Hayes
*Assistant Examiner*—Kambiz Abdi
(74) *Attorney, Agent, or Firm*—Schiff Hardin LLP

(57) ABSTRACT

In a method and an arrangement for increasing the throughput of mail when franking with a security imprint, the editing of the print image data is undertaken by a postage meter machine processor, and the calculation of the security code is undertaken by a separate security module while the print image data are being edited. A high system clock performance is achieved by interleaving of the two calculation tasks.

14 Claims, 6 Drawing Sheets

ARRANGEMENT AND METHOD FOR GENERATING A SECURITY IMPRINT

BACKGROUND OF THE INVENTION

1. Field of the Invention

The present invention is directed to an arrangement for generating a security imprint employing a security module as well as to a method for generating a security imprint, particularly a postal security module is a part of an arrangement that is particularly suited for employment in a postage meter machine or, respectively, mail processing machine or computer with a mail processing capability. The serves for protection against the use of unpaid frankings on postal matter.

2. Description of the Prior Art

European Application 862 143 discloses a postage meter machine for generating and checking a security imprint. A security imprint has a machine-readable marking with variable data and a crypto code or authentification code.

For checking the security imprint, the crypto code or authentification code formed of the variable data is compared to the printed crypto code or authentification code. The postage meter machine has a single microprocessor that calculates a crypto code or a DAC (data authentification code) for securing the print data as well as the print image itself. The latter is composed of fixed frame pixel data and window pixel data. Window pixel data are variable and semi-variable print data.

In order to optimally utilize the calculating time, it has been proposed to insert the print data for the crypto code or a DAC and those variable data that change relatively often into the calculated print image only shortly before the printing. In postage meter machines with column-by-column printing onto moving postal matter, the print line in the print head is orthogonal to the transport direction of the letter. This allows the possibility of transmitting the variable data directly into the print register of the print controller for the print head, with the transmission ensuing sequentially with the frame pixel data. This allows DAC print data that were completely calculated late also to be subsequently embedded during printing. Given run length encoding of the print data, for example, the T1000 postage meter machine of Francotyp-Postalia AG & Co., which employs a thermal transfer printing method, with the prerequisite that some of the fixed frame pixel data and some of the previously embedded window pixel data have already been printed, the DAC print data can be embedded later because the corresponding window must be printed later. If, however, a mail carrier has the requirement that the appertaining window be printed first, the embedding of the print data must ensue in advance. If the changes extend over a number of print columns, whereby more than half of the print columns of the overall print image must be modified, a corresponding lengthening of the calculating time results. A recalculation of the print image with other variable window data and with new DAC print data, however, is then required before every franking image printout. The franking throughput thus is significantly reduced when such print images for a security imprint occur.

SUMMARY OF THE INVENTION

An object of the present invention is to provide a method and an arrangement in order to increase the throughput of mail when franking with a security imprint.

In postage meter machines with high throughput (system clock), the method and arrangement must allow the franking imprint to be endorsed by a security code after every successful accounting operation. The endorsement must thereby be calculated fast enough in order to make it available for the calculation of the print image within the system clock of the postage meter machine. Even when modifications in the print data are maximum from imprint to imprint, the throughput should not be reduced because a security imprint is printed.

The object is achieved by the user of two time-offset calculations by different computers. Inventively, the calculation of the security code is undertaken by a separate security module while the editing of the print image data is being undertaken by the postage meter machine processor. A high system clock performance is achieved by appropriate interleaving of the two tasks and specific selection of algorithms and data structures, particularly when a stack of equivalent mail, or mixed mail, is to be processed.

The security module is implemented such that all system data required for the security code are preset by the postage meter machine by messages. Every message that modifies such system data immediately starts a recalculation of the security code, assuming insofar the security module recognizes the new system data as being valid. A request for accounting reported to the security module by a separate message starts the accounting. The security module sends the security code to the postage meter machine, whereby the latter undertakes the editing of the print data and calculation of the print image. A time-interleaving of the operations of the two data processing units, i.e. of the security module and the postage meter machine, for mass frankings with a high system clock, produces a high system performance. The time interleaving can only be enabled by the following two measures:

1. two processing units internally and externally of the security module,
2. pre-calculation of the security code on the basis of preset values.

A recalculation of the security code or DAC with the module processor is triggered insofar as the new system data are recognized as valid by the module processor of the security module, whereby the recalculation of the security code ensues on the basis of preset values. The serial number and the key indicator are the fixed system data. The print date, postage value and ascending register value are the variable system data. The print date remains constant given mass frankings. The first eight bytes of the data authorization code (DAC) are calculated in advance according to an algorithm in a first use for each day. Given a stack of equivalent mail, the postage value remains invariable. Of the data for a security imprint, at least the ascending register value changes, and can be calculated in advance for at least one franking, which is taken into consideration in mass frankings wherein the postage value remains invariable. The data authorization code (DAC) can be completely calculated for at least one piece of mail using the ascending register value that has been determined. The editing of the print image data ensues externally of the security module with a postage meter machine processor, while a hardware unit undertakes the debiting of the postage value in the security module. The security imprint satisfies especially strict security demands because the data that are printed can be verified and thus cannot be manipulated.

DESCRIPTION OF THE PREFERRED EMBODIMENTS

Figure 1A:
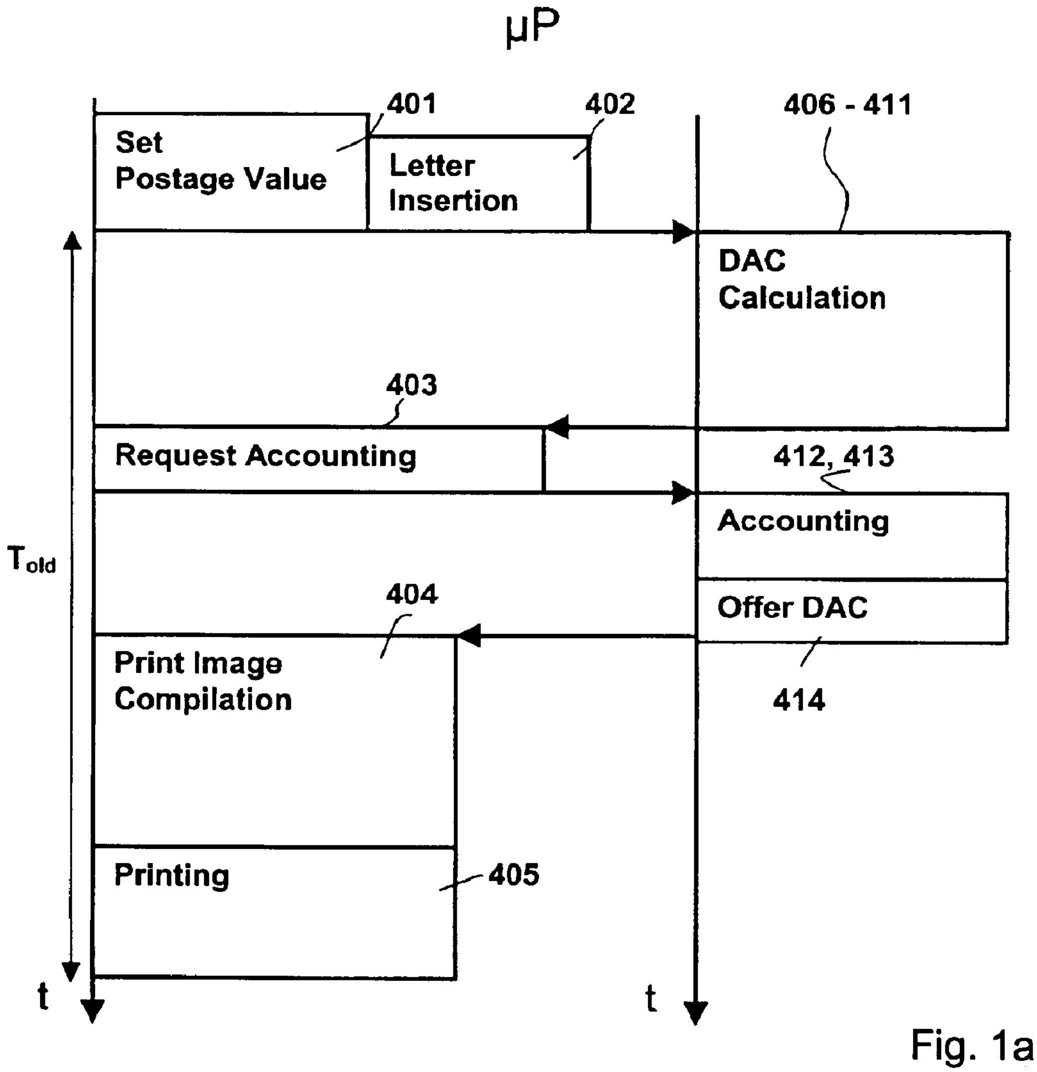
FIG. 1*a* is a time/control diagram for a postage meter machine of a known type with a microprocessor.

FIG. 1*a* shows a time/control diagram for a postage meter machine that is equipped in a known way with a microprocessor that implements the following steps for generating security imprints when franking:

input routine 401 in order to set the postage value;

sensor routine 402 in order to identify the letter insertion, with sub-routine 406–411 for DAC calculation;

request routine 403 for accounting, with sub-routine 412, 413 for the accounting and with sub-routine 414 for offering DAC;

calculation routine 404 for the print image; as well as print routine 405.

A data processing time duration $T_{old}$ per franking with a security imprint is required in the implementation of the individual routines and sub-routines due to the sequential processing.

Figure 1B:
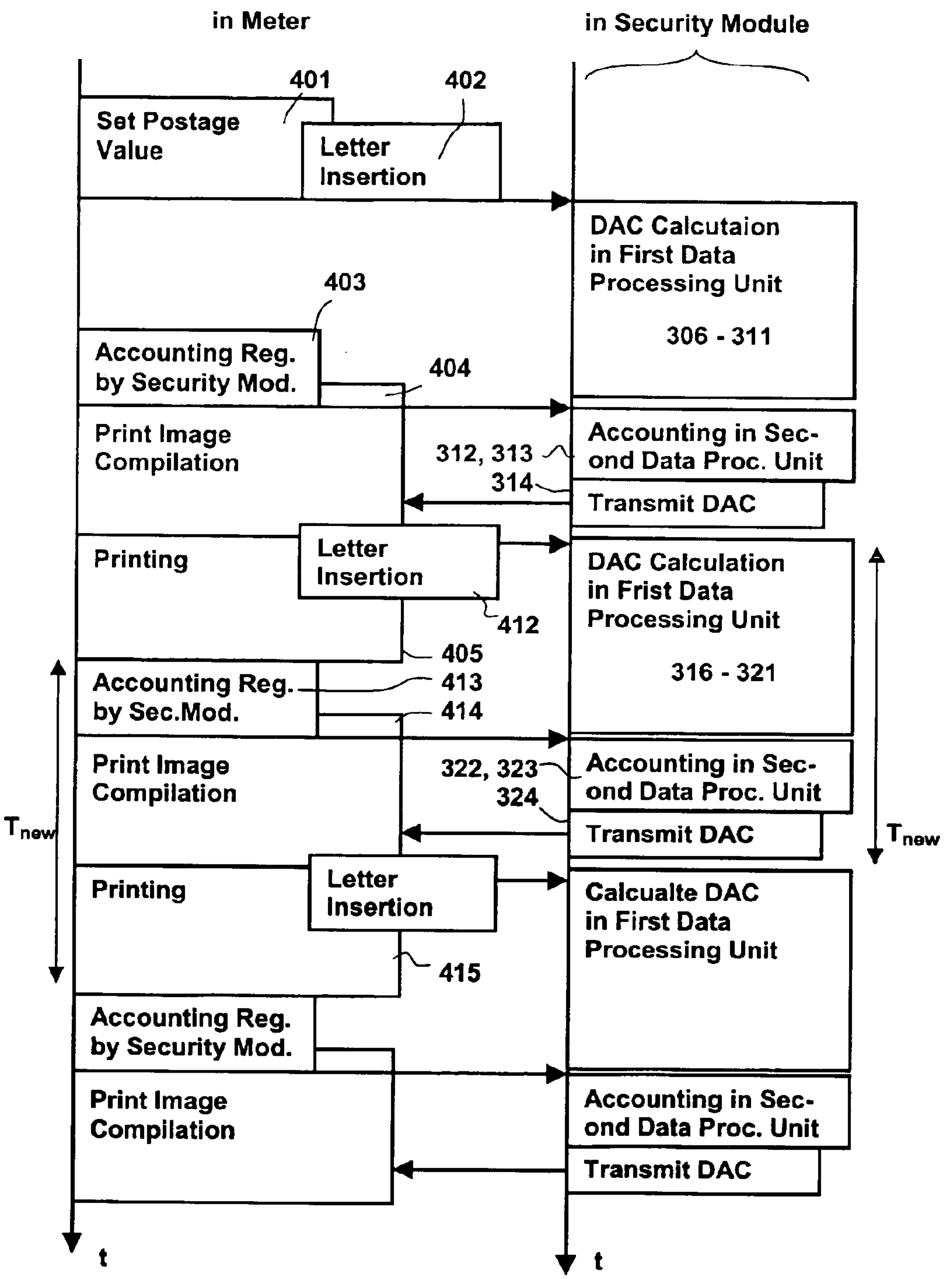
FIG. 1*b* is a time/control diagram for an inventive postage meter machine with a microprocessor in the meter for the printing tasks and a security module for the security tasks.

The inventive time/control diagram (shown in FIG. 1*b*) for a postage meter machine requires a data processing time duration $T_{new}$ per franking with a security imprint that is shorter than the old data processing time duration $T_{old}$ per franking. This is possible only because a division of tasks for two data processing units occurs in the invention, whereby a microprocessor is provided in the meter for the printing tasks and a security module is provided for the security tasks.

The printing tasks include an input routine 401 in order to set the postage value, a sensor routine 402 in order to determine the insertion of a letter, a request routine 403 for accounting, a calculating routine 404 for the print image as well as a print routine 405.

The security tasks include a sub-routine 406–411 for the DAC calculation, a sub-routine 412, 413 for the accounting and a sub-routine for offering the DAC.

The calculating routine 404 for the print image is especially complicated for a security imprint, for which reason the formatting of the print image already begins before the end of the accounting. Moreover, the microprocessor in the meter implements the print routine 405, while the security module already calculates the security code the next print image as soon as a letter sensor senses that a further letter is pending at the input of the transport path.

This is particularly meaningful given mass frankings of postal items, particularly letters, having the same postage value. The adjacency of a further letter that is acquired at the input of the transport path by a letter sensor triggers an interrupt for the microprocessor in the meter, which reports the pending letter to the security module and then continues with the calculations that have been begun for formatting the print image. How an interrupt for the microprocessor is triggered given a sensor signal and how the print controller works have been fundamentally disclosed by U.S. Pat. No. 5,710,721 entitled "Internal Postage Meter Machine Interface Circuit".

Inventively, the microprocessor stills works on formatting the print image (step 404) or is occupied with the implementation of the print routine (step 405) while the report 412 of a further letter pending ensues to the security module, whereupon the latter already implements further calculations 316–321 for a next piece of mail (letter).

As soon as the microprocessor is finished with the implementation of the print routine (step 405), a request is made to the security module to implement an accounting. The security module now implements the accounting (steps 322, 323) and sends (step 324) the security code DAC to the microprocessor 91 of the meter, which is now in a position to complete the formatting of the print image for the further print image (step 414).

Figure 2:
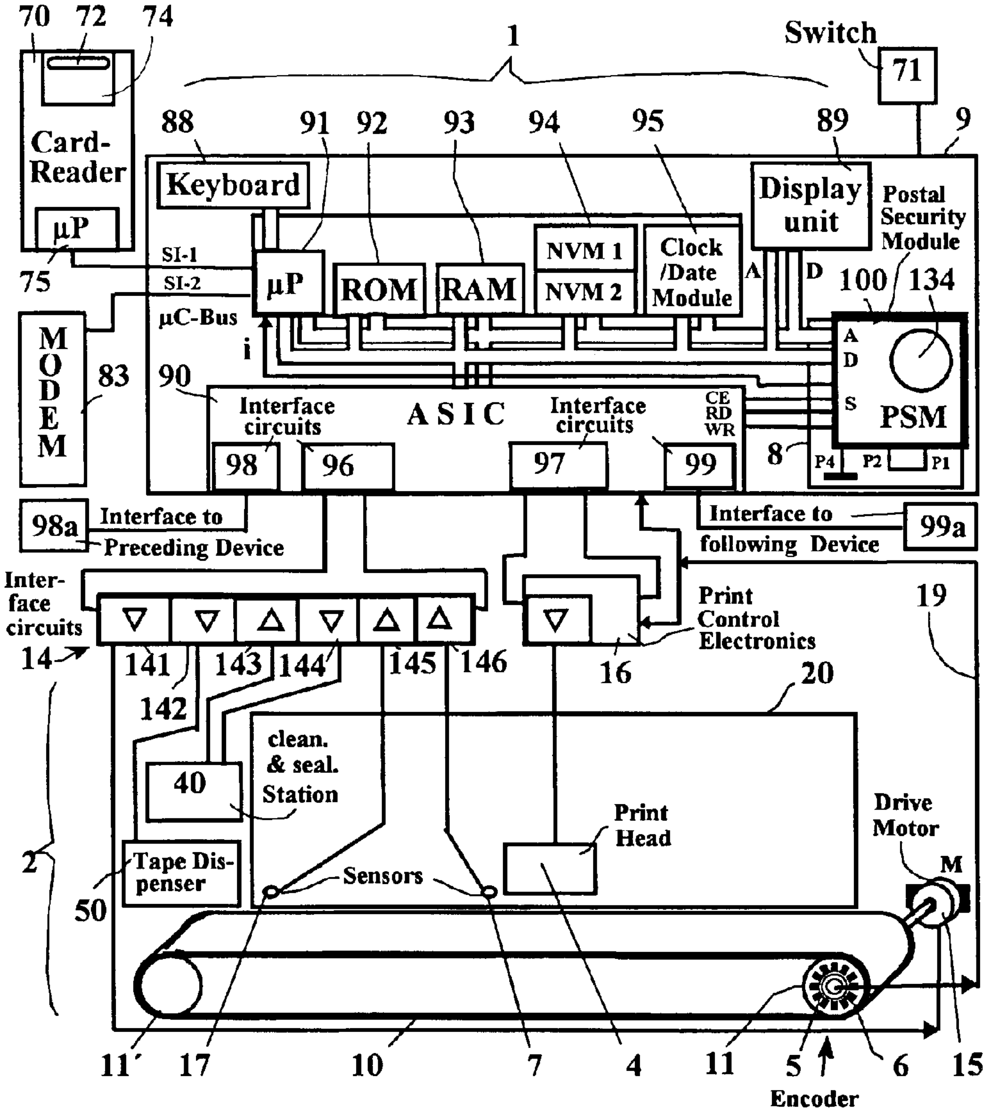
FIG. 2 is a block diagram of a postage meter machine with a security module.

FIG. 2 shows a block circuit diagram of a postage meter machine. The control unit 1 has a motherboard 9 equipped with a microprocessor 91 with appertaining memories 92, 93, 94, 95.

The program memory 92 contains an operating program at least for printing and contains at least security-relevant components of the program for a predetermined format change of a part of the payload data.

The main memory RAM 93 serves for the volatile intermediate storage of intermediate results. The non-volatile memory NVM 94 serves for the non-volatile intermediate storage of data, for example statistical data that are classified according to cost centers. The calendar/clock module 95 likewise contains addressable but non-volatile memory areas for the non-volatile intermediate storage of intermediate results or the storage of known program parts. The control unit 1 is connected to a chip card write/read unit 70, and the microprocessor 91 of the control unit 1 is programmed, for example, for loading the payload data N from the memory area of a chip card for application in corresponding memory areas of the postage meter machine. A first chip card 49 (see FIG. 3) inserted into an insertion slot 72 of the chip card write/read unit 49 allows loading of a dataset into the postage meter machine for at least one application. For example, the chip card 49 contains the postage fees for all standard mail carrier services according to the rate schedule of the postal authority and a mail carrier identifier in order to generate a stamp image with the postage meter machine and frank the pieces of mail in conformity with the rate schedule of the postal authority.

The control unit 1 forms the actual meter with the components 91 through 95 of the aforementioned motherboard 9 and also includes a keyboard 88, a display unit 89 as well as an application-specific circuit (ASIC) 90 and an interface 8 for the postal security module PSM 100. The security module PSM 100 is connected to the aforementioned ASIC 90 and the microprocessor 91 via a control bus and is also connected to the components 91 through 95 of the motherboard 9 and to the display unit 89 via the parallel $\mu$C bus. The control bus carries lines for the signals CE, RD and WR between the security module PSM 100 and the aforementioned ASIC 90. The microprocessor 91 preferably has a pin for an interrupt signal i emitted by the security module PSM 100, further terminals for the keyboard 88, a serial interface SI-1 for the connection of the chip card write/read unit 70 and a serial interface SI-2 for the optional connection of a modem. With the modem, for example, the credit stored in the non-volatile memory of the postal security module PSM 100 can be increased.

The postal security module PSM 100 is surrounded by a secured housing. A hardware-oriented accounting is implemented in the postal security module PSM 100. The accounting ensues independently of cost centers.

The ASIC 90 has a serial interface circuit 98 to a preceding device in the mail stream, a serial interface circuit 96 to the sensors and actuators of the printer 2, a serial interface circuit 97 to the print control electronics 16 for the printhead 4 and a serial interface circuit 99 to a device following the printer means 20 in the mail stream. German OS 197 11 997 discloses a suitable embodiment for the peripheral interface that is suitable for a number of periphery devices (stations).

The interface circuit 96 coupled to the interface circuit 14 situated in the machine base produces at least one connection to the sensors 6, 7, 17 and to the actuators, for example to the drive motor 15 for the drum 11 and to a cleaning and sealing station 40 for the printhead 4, (if it is an ink jet printhead) as well as to the label dispenser 50 in the machine base. The fundamental arrangement and the interaction between ink jet printhead 4 and the station 40 can be derived from German OS 197 26 642.

One of the sensors 7, 17 arranged in the guide plate 20 is the sensor 17 and serves the purpose of preparing for the print triggering given letter transport. The sensor 7 serves for recognizing the start of the letter for triggering printing given letter transport. The transport means is composed of a conveyor belt 10 and two drums 11, 11'. One of the drums is the drive drum 11 equipped with a motor 15; another is the entrained tensioning drum 11'. Preferably, the drive drum 11 is implemented as a toothed drum; correspondingly, the conveyor belt 10 is also implemented as a toothed belt, which assures positive transmission of forces. An encoder is coupled to one of the drums 11, 11'. Preferably, the drive drum 11 together with an incremental sensor 5 is firmly seated on a shaft. The incremental sensor 5 is implemented, for example, as a slotted disk that interacts with a light barrier 6 and outputs an encoder signal to the motherboard 9 via the line 19.

The individual print elements of the printhead are connected within the housing thereof to printhead electronics 16, so that the printhead can be driven for purely electronic printing. The print control ensues on the basis of the path control, whereby the selected stamp offset is taken into consideration, this being input via the keyboard 88 or, as needed, by chip card and being non-volatilely stored in the memory NVM 94. A planned imprint thus derives from the stamp offset (without printing), from the franking print image and, if desired, further print images for an advertising slogan, shipping information (selective prints) and additional messages that can be edited. The non-volatile memory NVM 94 has a number of memory areas. These include areas that store the loaded postage rate tables in non-volatile fashion.

The chip card write/read unit 70 is composed of an appertaining mechanical carrier for the microprocessor card and a contacting unit 74. The latter allows a secure mechanical holding of the chip card in the read position and unambiguous signaling of when the read position of the chip card is reached in the contacting unit. The microprocessor card with the microprocessor 75 has a programmed-in read capability for all types of memory cards or chip cards. The interface to the postage meter machine is a serial interface according to the RS232 standard. The data transmission rate amounts to a minimum of 1.2 K Baud. The activation of the power ensues with a switch 71 connected to the motherboard 9. A self-test function with a readiness message ensues after the power is turned on.

Figure 3:
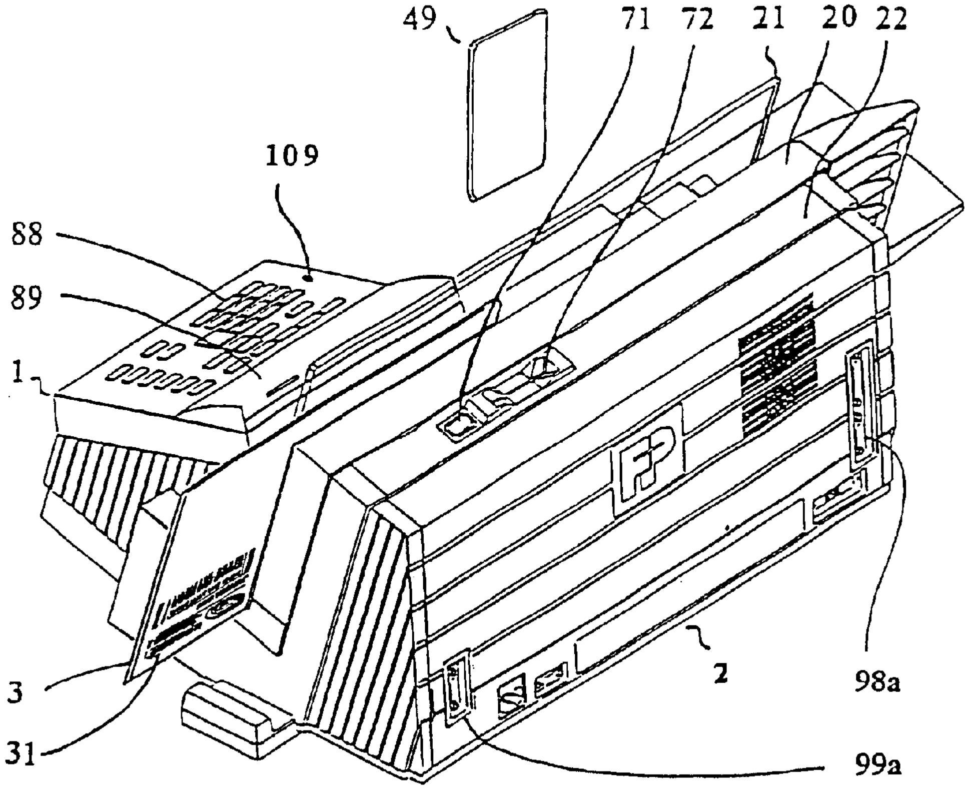
FIG. 3 is perspective view of the postage meter machine from behind.

FIG. 3 shows a perspective view of the postage meter machine from behind. The postage meter machine is composed of the meter 1 and of a base 2. The latter is equipped with the chip card write/read unit 70 that is arranged behind a guide plate 20 and is accessible from the upper edge 22 of the housing. After the postage meter machine is turned on with the switch 71, a chip card 49 is inserted into the insertion slot 72 from top to bottom. A letter 3 that is supplied standing on edge and that has its surface to be printed lying against the guide plate 20 is then printed with a security imprint 31 corresponding to the input data. The letter delivery opening is laterally limited by a transparent plate 21 and the guide plate 22. The status display of the security module 100 plugged onto the motherboard 9 of the meter 1 is visible from the outside through an opening 109.

Figure 4:
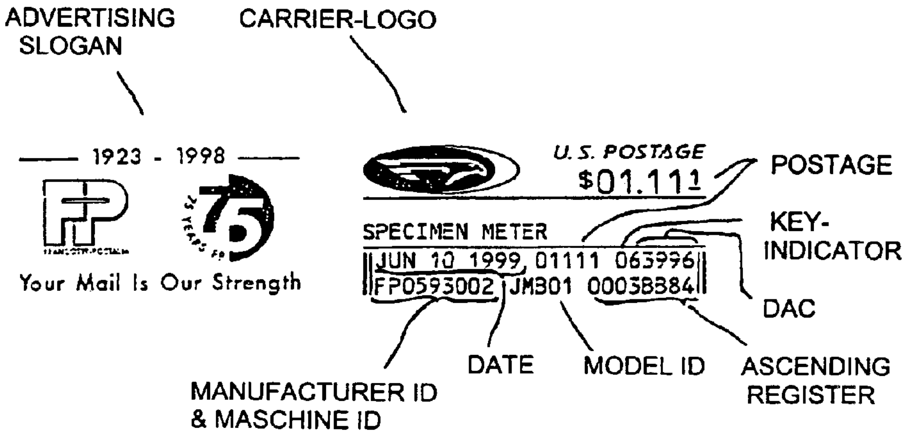
FIG. 4 is an illustration of a security imprint.

FIG. 4 shows an illustration of a security imprint as required by the USPS. The security imprint is arranged to the right of the advertizing slogan and includes the carrier logo and the postage value in the upper half and the date, the postage value, a key indicator and a data authentification code in a first line and a manufacturer ID, a machine ID, a model ID and the ascending register value in a second line in the lower half, whereby both lines are machine-readable. Both machine-readable lines are laterally limited by marking bars that improve the recognition and the interpretation of the characters according to an OCR method. A corresponding evaluation method for the aforementioned data that reproduce the characters is disclosed in European Application 862 143, corresponding to U.S. Pat. No. 5,953,426 for checking a security imprint.

Inventively, the calculation of the DAC for the security imprint is implemented in the security module. A further speed-up in the calculation of the security code is achieved by the selection of an assembler algorithm that is specifically selected and certified for the DES calculation. In order to also be able to authenticate print data that merely indicate parts of a date with an OCR read station, a “left-out value” is defined for these specific date values. This is employed instead of the date entry. For example, the value 0 is employed when the corresponding date parts are not present.

Storing the current date in two different formats and memory locations is necessary in order to check the print date for validity, since the format of the security modules internal real-time clock (RTC) differs from the format of the date employed in the print image and a comparison at the point in time of the accounting requires corresponding time.

The structure and the interpretation of the system data that enter into the security code, as well as the system data that are used by the FM for the printing enable a further speed-up.

Since the print date usually remains constant given mass frankings, the first 8 bytes of the security code can be calculated in advance for each day in a first 3DES routine.

Table 1 shows a further example for the data that proceed from a security imprint.

TABLE 1

| # | Information | | Value Range | | Left out | Leading Zeroes |
|---|---|---|---|---|---|---|
| 1. | | | Lower | Upper | | |
| 2. | Date of mailing | Month: | JAN | DEC | ‘---’ | |
| 3 | | Day: | 01 | 31 | ‘--’ | YES |
| 4. | | Year: | 1999 | | ‘----’ | |
| 5. | Postage | | 00000 | 99999 | | YES |
| 6. | Key indicator | | 0 | 9 | | |

TABLE 1-continued

| # | Information | Value Range | | Left out | Leading Zeroes |
|---|---|---|---|---|---|
| 7. | Data authentication code | 00000 | 65535 | | YES |
| 8. | Vendor ID | FP | | | |
| 9. | Machine ID | 0000001 | 9999999 | | YES |
| 10. | Model ID | JMB01 | JMB99 | | |
| 11. | Ascending register | 00000000 | FFFFFFFF | | YES |

Table 2 illustrates the length of the required bytes of individual and of all system data that enter into the calculation of the security code.

TABLE 2

| | Element | Byte length | Value range (decimal) |
|---|---|---|---|
| 1. | Machine ID | 4 | 7-digit value range for Francotyp-Postalia |
| 2. | OCR key indicator | 1 | 0 . . . 9 |
| 3. | Mailing date | Total: 3 | |
| | Sub-elements: | Detail: | |
| | Year | 1 | 0 . . . 99, |
| | Month | 1 | 0 . . . 12, |
| | Day | 1 | 0 . . . 31, |
| 4. | Postage value | 4 | 0 . . . 99999 (unit is 1/10 cents) |
| 5. | Ascending register | 4 | 0 . . . 4294967295 (unit is 1/10 cents) |
| | TOTAL: | 16 | |

Table 3 shows and example of system data for a security code.

a communication connection with a remote data center. The accounting is accomplished by the ASIC 150. The postal accounting data are stored in non-volatile memories of different technologies.

System voltage is present at the supply input of a second memory NVRAM 114. This is thereby a non-volatile memory NVRAM of a second technology (shadow-RAM). This second technology preferably is formed by a RAM and an EEPROM, whereby the latter automatically accepts the data contents given an outage of the system voltage. The NVRAM 114 of the second technology is connected to the corresponding address and data inputs of the ASIC 150 via an internal address and data bus 112, 113.

The ASIC 150 contains at least one hardware accounting unit for the calculation of the postal data to be stored. An access logic for the ASIC 150 is accommodated in the programmable array logic (PAL) 160. An address and control bus 117, 115 of the motherboard 9 is connected to corresponding pins of the logic PAL 160, and the PAL 160 generates at least one control signal for the ASIC 150 and a control signal 119 for the program memory FLASH 128. The processor 120 processes a program that is stored in the FLASH 128. The processor 120, FLASH 28, ASIC 150 and PAL 150 are connected to one another via an internal module system bus that contains lines 110, 111, 126, 119 for data, address and control signals.

The reset unit 130 is connected via the line 131 to the pin 3 of the processor 120 and to a pin of the ASIC 150. The processor 120 and the ASIC are reset by a reset signal generated in the reset unit 130 if the supply voltage drops.

Lines that form a conductor loop 18 only given a PSM 100 plugged to the motherboard 9 are connected to the pins 6 and 7 of the processor 120.

TABLE 3

| | Serial number | | | | K1 | Mailing date | | | Postage value | | | | Ascending register | | | |
|---|---|---|---|---|---|---|---|---|---|---|---|---|---|---|---|---|
| Decimal data | 0050010 | | | | 1 | Feb 17 1999 | | | $12.300 | | | | $129.300 | | | |
| Hex. data | 00 | 00 | C3 | 5A | 01 | 63 | 02 | 11 | 00 | 00 | 30 | 0C | 00 | 1F | 91 | 14 |

Figure 5:
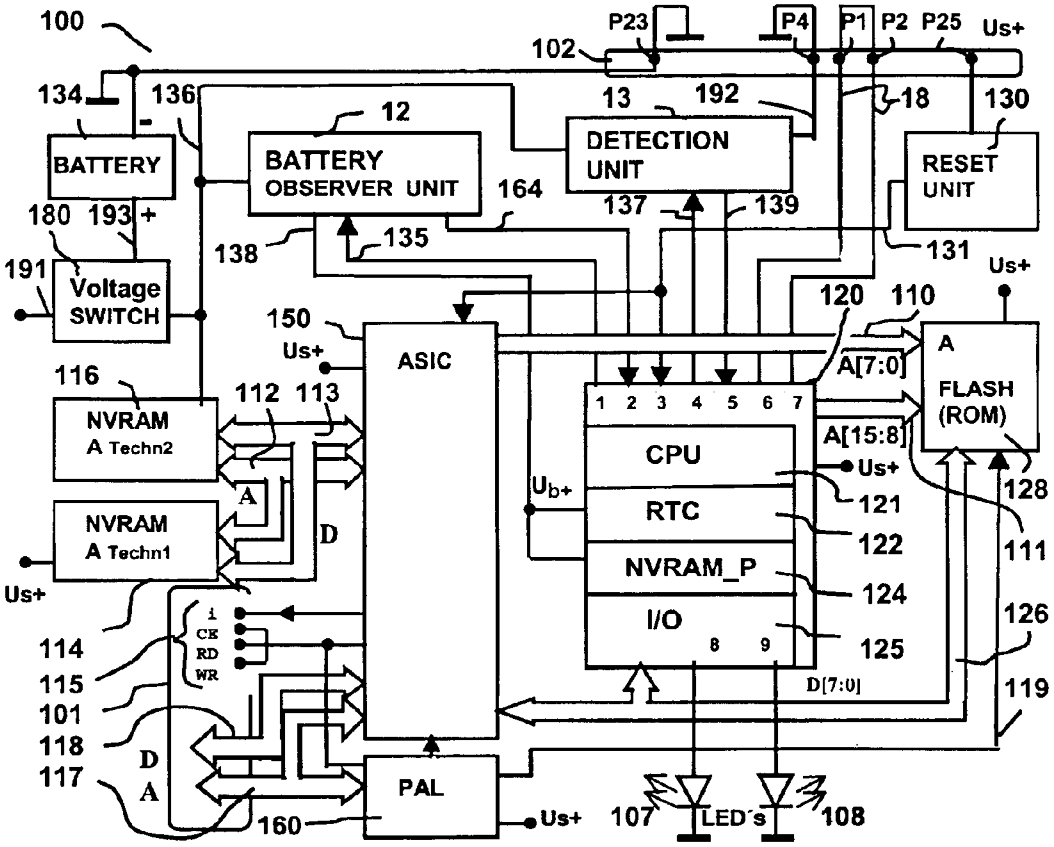
FIG. 5 is a block circuit diagram of the inventive security module.

FIG. 5 shows a block diagram of a preferred version of the postal security module PSM 100. The negative pole of the battery 134 is applied to ground and a pin P23 of the contact group 102. The positive pole of the battery 134 is connected via the line 193 to the one input of the voltage switchover 180, and the line 191 carrying system voltage is connected to the other input of the voltage switchover 180. The type SL-389/P is suitable as the battery 134 for a service life of up to 3.5 years or the type SL-386/P is suitable for a service life up to 6 years given a maximum power consumption by the PSM 100. A commercially obtainable circuit of the type ADM 8693ARN can be utilized the voltage switchover 180. The output of the voltage switchover 180 is supplied via the line 136 to a voltage monitoring unit 12 and the detection unit 13. The voltage monitoring unit 12 and the detection unit 13 have a communication connection to the pins 1, 2, 4 and 5 of the processor 120 via the lines 135, 164 and 137, 139. The output of the voltage switchover 180 is also supplied via the line 136 at the supply input of a first memory SRAM 116 that, due to the existing battery 134, serves as a non-volatile memory NVRAM of a first technology.

The security module is in communication with the postage meter machine via the system bus 115, 117, 118. Via the system bus and a modem 83, the processor 120 can enter into The processor 120 internally has a processing unit CPU 121, a real-time clock (RTC) 122, a RAM unit 24 and an input/output unit 125. I/O ports (pins 8 and 9) of the input/output unit 125 are connected to an internal module signal indicator, for example colored light-emitting diodes LED 107, 108, that signal the status of the security module 100. The security module can assume various statuses in its life cycle. Thus, for example, whether the module contains valid cryptographic keys must be detected. Further, it is also important to distinguish whether the module is functioning or malfunctioning. The exact nature and number of module statuses is dependent on the realized functions in the security module and on their implementation.

The processor 120 of the security module 100 is connected via an internal module data bus 126 to a FLASH 128 and to the ASIC 150. The FLASH 128 serves as a program memory and is supplied with system voltage Us+. For example, it is a 128 Kbyte FLASH memory of the type AM29F010-45EC. The ASIC 150 of the postal security module 100 supplies the addresses 0 through 7 to the corresponding address inputs of the FLASH via an internal module address bus 110. The processor 120 of the security module 100 supplies the addresses 8 through 15 to the corresponding address inputs of the FLASH 128 via an internal address bus 111. The ASIC 150 of the security module 100 has a communication connection with the data bus 118, the address bus 117 and the control bus 115 of the motherboard 9 via the contact group 101 of the interface.

The real-time clock 122 and the memory RAM 124 are supplied with an operating voltage via the line 138. This voltage is generated by the voltage monitoring unit (battery observer) 12. The latter also supplies a status signal 164 and reacts to a control signal 135. As output voltage on the line 136 for the voltage monitoring unit 12 and memory 116, the voltage switchover 180 outputs that of its input voltages that is higher than the other. Due to the possibility of automatically feeding the described circuit with the higher of the two voltages dependent on the amplitude of the voltages Us+ and Ub+, the battery 134 can be replaced during normal operation without data loss.

In the idle times outside normal operation, the battery of the postage meter machine supplies the real-time clock 122 having date/time-of-day registers and/or the static RAM (SRAM) 124, which contains security-relevant data, in the aforementioned way. If the voltage of the battery 134 drops below a certain limit during battery operation, then the circuit described in the exemplary embodiment connects the feed point for the real-time clock 122 and SRAM 124 to ground, i.e., the voltage at the real-time clock 122 and at the SRAM 124 then lies at 0 V. This causes the SRAM 124, which, for example, contains important cryptographic keys, to be very quickly erased. At the same time, the registers of the real-time clock 122 are also erased and the current time of day and the current date are lost. This action prevents a possible tamperer from stopping the internal real-time clock 122 of the postage meter machine by manipulating the battery voltage without security-relevant data being thereby lost. The tamperer is thus prevented from evading security measures such as, for example, long time watchdogs.

Simultaneously with the indication of the under-voltage of the battery 134, the described circuit switches into a self-holding state, in which it remains even when the voltage is subsequently increased. The next time the module is turned on, the processor 120 can interrogate the status of the circuit (status signal) and can conclude that the battery voltage fell below a specific value in the interim in this way and/or via the interpretation of the contents of the erased memory. The processor 120 can reset the monitoring circuit, i.e. "arm" it.

Further measures for protecting a security module against an attack on the data stored in it were also proposed in German applications 198 16 572.2 8 and 198 16 571.4, as well as co-pending U.S. application Ser. No. 09/522,619 (filed Mar. 10, 2000) and Ser. No. 09/522,620 (filed Mar. 10, 2000) and Ser. No. 09/522,621 (filed Mar. 9, 2000) and German Utility Model application 299 05 219.2. A pluggable security module can assume various states in its life cycle. A distinction can be made as to whether the security module is functioning or malfunctioning. One thereby depends on the non-manipulatability of the hardware-oriented accounting without monitoring this again. Any other software-controlled operation is only considered error-free as long as the original programs remain intact, which must therefore be protected against manipulation.

The first data processing unit 120 is inventively programmed by a program stored in the program memory 128 of the security module to calculate the data authorization code DAC in advance and to communicate it to the separate data processing unit $\mu$P, 91, which is programmed by a program in its program memory 92 to edit the print data and calculate a print image approximately simultaneously with the operation of advance calculation. The first data processing unit 120 of the security module 100 has an internal non-volatile memory 124 in which at least at least one key for the calculation of the data authorization code (DAC) is stored in a manner protected against access. A second data processing unit 150 for an accounting of the postal registers is provided in the security module 100, so that the data processing unit in the meter separate from the security module 100 forms a third data processing unit 91, particularly for processing the print tasks.

A hardware accounting unit for the implementation of the accounting, which stores the new postal register set with the accounting data in the non-volatile memories 114, 116, is contained in the second data processing unit ASIC 150.

The first data processing unit is a module processor 120 of the security module that is preferably programmed to calculate the first 8 bytes of the data authorization code (DAC) in advance for each day according to an algorithm in a first routine. The algorithm for the data authorization code (DAC) includes a DES algorithm, particularly a triplet DES algorithm (3DES).

Given individual mail processing, the module processor 120 of the security module is programmed to pre-calculate the data authorization code (DAC) after input of a postage value. For mass mail processing, the processor 120 pre-calculates the next, following data authorization code (DAC) after debiting the preceding postage value when the postage value is not changed and, after pre-calculating the data authorization code (DAC), this is immediately communicated it to the third data processing unit 91.

The internal non-volatile memory 124 is an SRAM memory of the module processor 120 supported by the battery 134 and is fashioned with areas for protected storage of at least a part of the data of a postal register set that arises given an advance calculation. The (at least one) key required for the calculation of a data authorization code (DAC) is stored in a protected manner in one of the memory areas.

The module processor 120 of the security module 100 is programmed to determined the ascending register value R2 in advance with the postage value and, taking the determined value into consideration, to pre-calculate the data authorization code (DAC) for the data of the security imprint. The data authorization code (DAC) can be calculated in advance taking, for example, the following data into consideration: machine identification, OCR key indicator, date, postage value and register value R2 to for the ascending register that was determined in the advance calculation.

The method for generating a security imprint is essentially includes the steps of:

- advance calculation of the ascending register value R2,
- advance calculation of the data authorization code,
- communication of the data authorization code to a separate data processing unit 91 that is fashioned to edit the print data externally from the security module 100, to calculate the print image and print it out.

Figure 6:
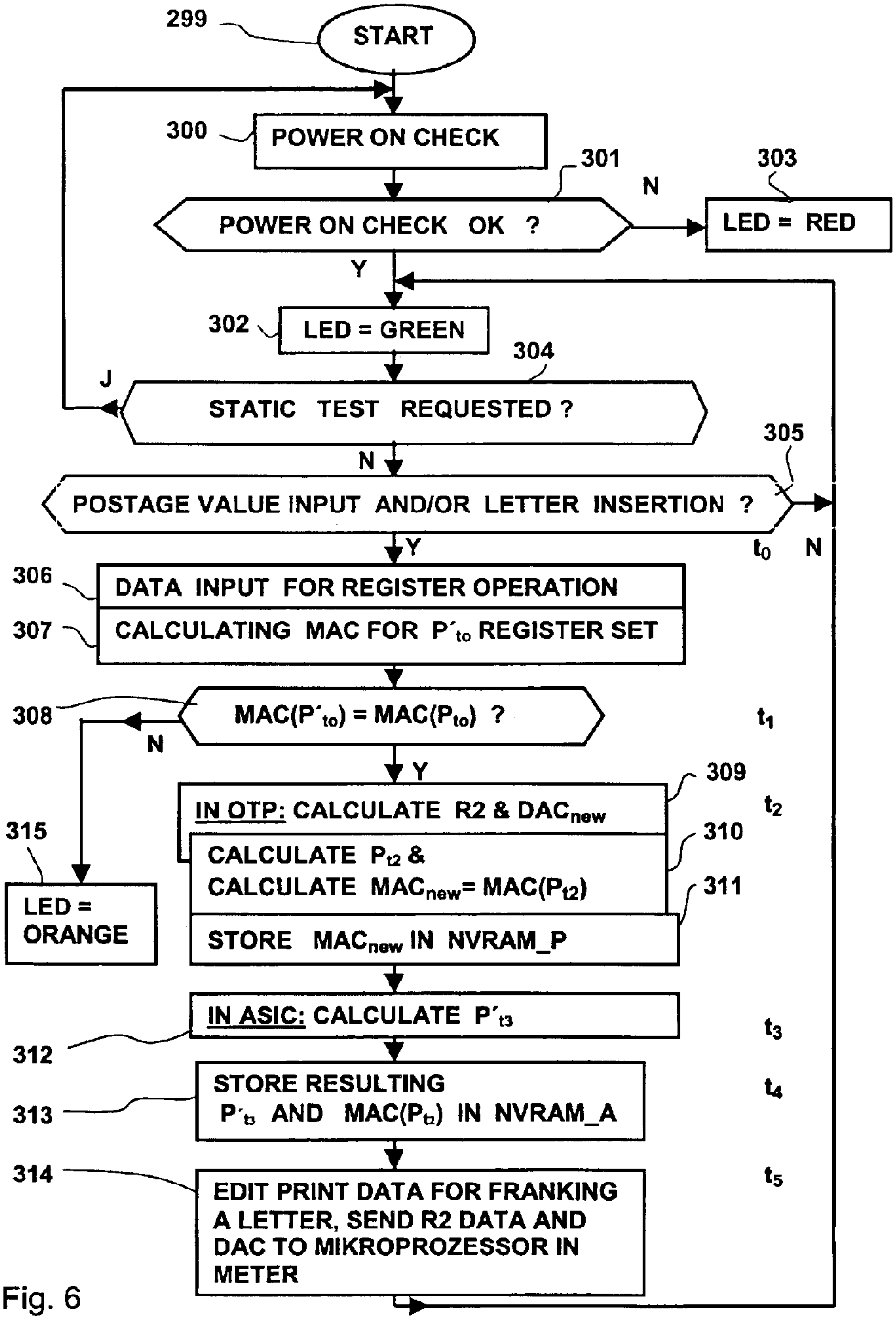
FIG. 6 is a flowchart for generating security imprints in accordance with the invention during franking.

The routines that sequence in the system before the franking are explained in greater detail on the basis of the flowchart shown in FIG. 6. As a result of a corresponding program stored in the FLASH 128, the microprocessor CPU 121 is programmed to implement self-tests, whereby, following the start 299, a power-on self-test is implemented in a first step 300, and a query is then made in step 301 as to whether the power-on self-test yielded an OK. When this is the case, the microprocessor CPU 121 turns the green LED 107 on via an I/O port 125 in step 302. Otherwise the microprocessor CPU 121 turns the red LED 108 on via an I/O port 125 in step 303.

From step 302, a branch is made to the query 304 wherein a check is carried out to see whether a further static test is requested. When this is the case, then a branch is made back to step 300. Otherwise, a branch is made to the query 305 wherein a check is carried out to determine whether a letter sensor has identified a letter insertion, or whether the module processor 120 has recognized an input of a new postage value. If neither is the case, then a branch is made back to the step 302, and thus a waiting loop is executed until a letter insertion/new input has been identified. In the latter instance a branch is made to the step 306 in order to end the input of the data. At the same time or beginning shortly after time $t_0$, a step 307 is started for the MAC calculation on the basis of the postal register data $P'_{t0}$ available at time $t_0$. A MAC($P_{t0}$) already formed earlier by the module processor 120 is valid at time $t_0$. The MAC calculation is ended at time $t_1$. The calculated MAC($P'_{t0}$) is compared in step 308 at time $t_1$ to the old MAC($P_{t0}$) valid at time $t_0$ (and already formed earlier by the module processor 120). Given non-coincidence, a branch is made to step 315 in order to drive the LEDs 107, 108 to emit orange. Otherwise, a branch is made to the steps 309. An advance calculation of the ascending register value $R2_{t2}$ and a $DAC_{new}$ calculation ensues therein in the module processor 120 at time $t_2$. In step 310, a pre-calculation of the postal register set $P_{t2}$, a $MAC_{new}$ formation, possibly with storing in the NVRAM_P 124, subsequently ensue. The advance calculation of the data authorization code (DAC) involves the ascending register value R2 and further data from a time $t_{i+1}$, that lies following the end of the data input and/or, given mass frankings, from when a further piece of mail pends and before the actual accounting (312). Of the further data, which at least include the postage value p and the date, at least the machine ID and possibly the date, can be involved in the advance DAC calculation from the time ($t_0$) a further piece of mail pends when it remains unmodified for the respective stack of letters to be franked. The generation in the security module is ended by time $t_5$.

When, in step 311, the storing of the MAC($P_{t2}$) in the NVRAM_P has been ended by the data processing unit 120, the other data processing unit, namely the hardware accounting unit (shown in FIG. 5) in the ASIC 150, implements a calculation of the new postal register set at time $t_3$ in step 312.

Storage of the results $P't_3$ and MAC($P_{t2}$) in the NVRAM_A ensues in a final step 313. In preparation for a franking, a number of other steps can then also be executed serially or in parallel with the aforementioned steps, these at least including a sub-step for generating a security code DAC and ending with a step 314 for editing print data for franking the letter. The latter, however, at least contains the sending of the security code DAC to the microprocessor 91 of the meter 1. Subsequently, a branch is made back to step 302.

Although a fundamentally identical MAC formation procedure is likewise used for generating a DAC security code, the DAC is composed of the ascending register value R2 and of further data (machine ID, OCR key indicator, date, postage value p), and the generation ensues at a different time $t_{i+1}$, for example beginning with the end of the data input. When system data such as OCR key indicator, the machine ID and the date remain unmodified from the end of the data input for the respective stack of letters to be franked, these, beginning with the end of the data input, can be involved in an advance calculation of 8 bytes of the data authorization code (DAC). For further calculation of the data authorization code (DAC), variable system data like the postage value and the ascending register value can also be involved later at the time of the accounting. Given mass frankings, it is provided following the communication of the data authorization code to the separate data processing unit 91 that the module processor 120 finishes calculating the next-successive data authorization code (DAC) at least taking the pre-calculated ascending register value R2 and the pre-calculated n bytes into consideration.

The module processor 120 collaborates with the control processor 91 (shown in FIG. 5) of the meter 1, whereby the latter at least receives the security code DAC($R2_{t(i+1)}$, further data), compiles the print data and transmits them to the printhead.

Inventively, the security module is intended for use in postal devices, particularly for use in a postage meter machine. However, the security module can also have some other format that allows it to be used with a personal computer, which functions as third data processing unit. For example, it can be connected to the motherboard of a personal computer that, as a PC franker, drives a commercially obtainable printer.

Although modifications and changes may be suggested by those skilled in the art, it is the intention of the inventors to embody within the patent warranted hereon all changes and modifications as reasonably and properly come within the scope of their contribution to the art.

We claim as our invention:

1. An arrangement for generating a security imprint comprising:

- a security module containing a first program memory in which a first program is stored and a security module data processing unit connected to said first program memory and being programmed by said first program to calculate a multi-byte security code from existing system data and to be able to receive new system data to modify said existing system data;
- a separate data processing unit disposed externally of said security module and having a second program memory in which a second program is stored, said separate data processing unit being programmed by said second program to edit print data to compile a print image that contains said security code as a security imprint and that embodies a monetary value for franking a mail item;
- said security module data processing unit being further programmed by said first program to, immediately upon receipt of said new system data, validate said new system data and determine whether said new system data are required for said security code and, only if so, to immediately begin recalculating a portion of said security code in a first routine and, in a second routine, to finish recalculating said security code for at least one security imprint, thereby producing a recalculated security code, and to initiate an accounting operation for said monetary value and to communicate the recalculated security code to said separate data processing unit; and
- said separate data processing unit, upon receiving said recalculated security code, compiling said print image containing said recalculated security code as a security imprint and embodying said monetary value.

2. An arrangement as claimed in claim 1 wherein said security code is a data authorization code and wherein said security module data processing unit contains an internal non-volatile memory in which at least one key for calculating said data authorization code is protectively stored against access and wherein said security module contains a further security module data processing unit for performing said accounting.

3. An arrangement as claimed in claim 2 wherein said security module data processing unit is a processor programmed by said first program to calculate a first eight bytes of said data authorization code in advance in said first routine each day, and wherein said further security module data processing unit is a hardware accounting unit which produces an accounting result as a result of said accounting in said second routine, and wherein said security module further contains a non-volatile memory, accessible by said hardware accounting unit, in which said hardware accounting unit stores said accounting result.

4. An arrangement as claimed in claim 3 wherein said processor is programmed by said first program to determine an ascending register value, dependent on said monetary value, for at least one mail item, and to finish calculating said data authorization code in said second routine for said at least one mail item using said ascending register value.

5. An arrangement as claimed in claim 3 for use with a plurality of mail items all having the same monetary value for franking, and wherein said processor is programmed by said first program to pre-calculate a next-successive data authorization code for a next mail item after debiting said monetary value for a preceding mail item, and to immediately communicate said next-successive data authorization code to said separate data processing unit.

6. An arrangement as claimed in claim 3 wherein said internal non-volatile memory is an SRAM of said processor, and wherein said security module further comprises a battery supporting said SRAM, and wherein said SRAM had memory areas for protected storage of at least some data produced by said pre-calculation, and wherein said at least one key for calculating said data authorization code is protectively stored in a memory area of said SRAM.

7. An arrangement as claimed in claim 6 wherein said processor is programmed by said first program to calculate said data authorization code using a machine identifier and OCR key indicator, a date, said monetary value, and a register value for an ascending register.

8. An arrangement as claimed in claim 2 wherein said processor is programmed by said first memory to calculate said data authorization code using an algorithm selected from the group consisting of DES algorithms and triplet DES algorithms.

9. A method for generating a security imprint, comprising the steps of:

providing a security module containing a security module data processing unit;

presetting all system data required for calculating a security code and, only upon receipt of new system data requiring a re-calculation of the security code, in said security module data processing unit immediately validating said new system data and re-calculating said security code using said new system data, by immediately beginning re-calculating a portion of said security code in a first routine, and a second routine, finishing re-calculating the security code to produce a re-calculated security code;

also in said security module data processing unit, calculating an ascending register value for a monetary value associated with said new system data; and communicating the re-calculated security code to a separate data processing unit external of said security module and, in said separate data processing unit, compiling a print image, including said security code as a security imprint and printing said print image.

10. A method as claimed in claim 9 comprising calculating a data authorization code in said security module data processing unit as said security code dependent on said ascending register value and additional data in said new system data and generating said security imprint at a time following an end of entry of said new system data and before conducting an accounting for said monetary value.

11. A method as claimed in claim 9 wherein said new system data are associated with an inserted mail item and wherein said security code is a data authorization code and wherein said security module data processing unit calculates said data authorization code dependent on said ascending register value and additional data in said new system data at a time from said insertion of said mail item and before conducting an accounting for said monetary value.

12. A method as claimed in claim 9 wherein said security code is a data authorization code and wherein said security module data processing unit calculates said data authorization code dependent on a machine identifier, said monetary value and a current date, and wherein at least said machine identifier is included in a pre-calculation of n bytes of said data authorization code.

13. A method as claimed in claim 9 wherein said security code is a data authorization code and wherein said security module data processing unit calculates said data authorization code dependent on a machine identifier, said monetary value and a current date, and wherein at least said machine identifier and said date is included in a pre-calculation of n bytes of said data authorization code.

14. A method as claimed in claim 9 comprising successively supplying sets of new system data to said security module data processing unit and after communicating said security code to said separate data processing unit, in said security module data processing unit beginning calculation of a next-successive security code for next new system data, at least dependent on said ascending register value to produce pre-calculated n bytes of said next-successive security code.

* * * * *